(12) United States Patent
Abel

(10) Patent No.: US 10,549,571 B1
(45) Date of Patent: Feb. 4, 2020

(54) TACTICAL PEN

(71) Applicant: Jeffrey Talley Abel, Darby, MT (US)

(72) Inventor: Jeffrey Talley Abel, Darby, MT (US)

( * ) Notice: Subject to any disclaimer, the term of this patent is extended or adjusted under 35 U.S.C. 154(b) by 57 days.

(21) Appl. No.: 15/974,467

(22) Filed: May 8, 2018

Related U.S. Application Data

(60) Provisional application No. 62/504,142, filed on May 10, 2017.

(51) Int. Cl.
| | | |
|---|---|---|
| *B43K 29/18* | (2006.01) | |
| *B43K 29/00* | (2006.01) | |
| *G06F 3/0354* | (2013.01) | |
| *B25F 1/02* | (2006.01) | |
| *B43K 7/00* | (2006.01) | |
| *A45C 11/24* | (2006.01) | |

(52) U.S. Cl.
CPC .............. *B43K 29/18* (2013.01); *A45C 11/24* (2013.01); *B43K 7/005* (2013.01); *B43K 29/004* (2013.01); *G06F 3/03545* (2013.01); *B25F 1/02* (2013.01)

(58) Field of Classification Search
CPC ...... B43K 29/18; B43K 7/005; B43K 21/003; B43K 29/004; B43K 29/00; B43K 29/002; B43K 29/007; B43K 29/02; B43K 29/05; B43K 29/06; B43K 29/10; B65D 7/045; A45C 15/00; G06F 3/03545; A62B 3/00; F41B 13/00
See application file for complete search history.

(56) References Cited

U.S. PATENT DOCUMENTS

| 1,725,064 A | * | 8/1929 | Easton | B43K 25/022 30/123 |
|---|---|---|---|---|
| 2,354,402 A | * | 7/1944 | Petruccione | A61F 17/00 206/225 |
| 2,841,156 A | * | 7/1958 | Herald | A45D 29/04 132/73.5 |
| 5,938,357 A | * | 8/1999 | Faraj | B43K 29/00 401/18 |
| 6,910,824 B2 | * | 6/2005 | Holland | B43K 7/005 401/192 |
| 8,282,297 B2 | * | 10/2012 | Ryan | B43K 7/005 401/116 |
| 9,108,454 B1 | * | 8/2015 | Rosenberg | B43K 29/00 |
| 2003/0185619 A1 | * | 10/2003 | Nagaoka | G06F 1/1626 401/258 |

* cited by examiner

*Primary Examiner* — David J Walczak
(74) *Attorney, Agent, or Firm* — Timberline Patent Law Group

(57) ABSTRACT

Representative implementations of devices and techniques provide a tactical pen that may include various useful features and components, according to various embodiments. In the implementations, the tactical pen is comprised of multiple components (e.g., two or more sections) which may be coupled together and which may be sealed with one or more seals to provide moisture or humidity protection to the contents of the pen. For example, in addition to an ink pen refill (e.g., ball-point pen refill), the tactical pen may include one or more cavities or compartments to store items, a sharp implement, as well as one or more additional tools or implements.

20 Claims, 4 Drawing Sheets

TACTICAL PEN

PRIORITY CLAIM AND CROSS-REFERENCE TO RELATED APPLICATION

This application claims the benefit under 35 U.S.C. § 119(e)(1) of U.S. Provisional Application No. 62/504,142, filed May 10, 2017, which is hereby incorporated by reference in its entirety.

BACKGROUND

A multi-tool may include various components (such as tools, instruments, etc.) in a single package for convenience of the user. One of the desirable features of a multi-tool is that the user can carry a single (generally compact) item that likely includes many of the tools that the user may need throughout the day. For example, one of the earliest common multi-tools was the pocket knife, which could include a combination of tools such as a screwdriver, a corkscrew, an awl, a bottle opener, and the like, in addition to one or more knife blades, which would all fold conveniently into a handle/case designed to fit into the user's pocket. Later multi-tools can include scissors, pliers, multiple types of screwdrivers, a saw, a ruler, a compass, and so forth, which can be folded into the handle of the multi-tool.

However, the design of a traditional multi-tool can have limitations to the practicality of the items that may be included with the multi-tool. In other words, even if a tool is included in a multi-tool package, it may not be practical for a user to use the tool because of the limitations of the package. For instance, while the handle of a multi-tool may make a convenient grip for a user while using a knife blade unfolded from the handle, the handle may not be as convenient for the user if attempting to use a writing or etching instrument, for example, unfolded from the handle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1:
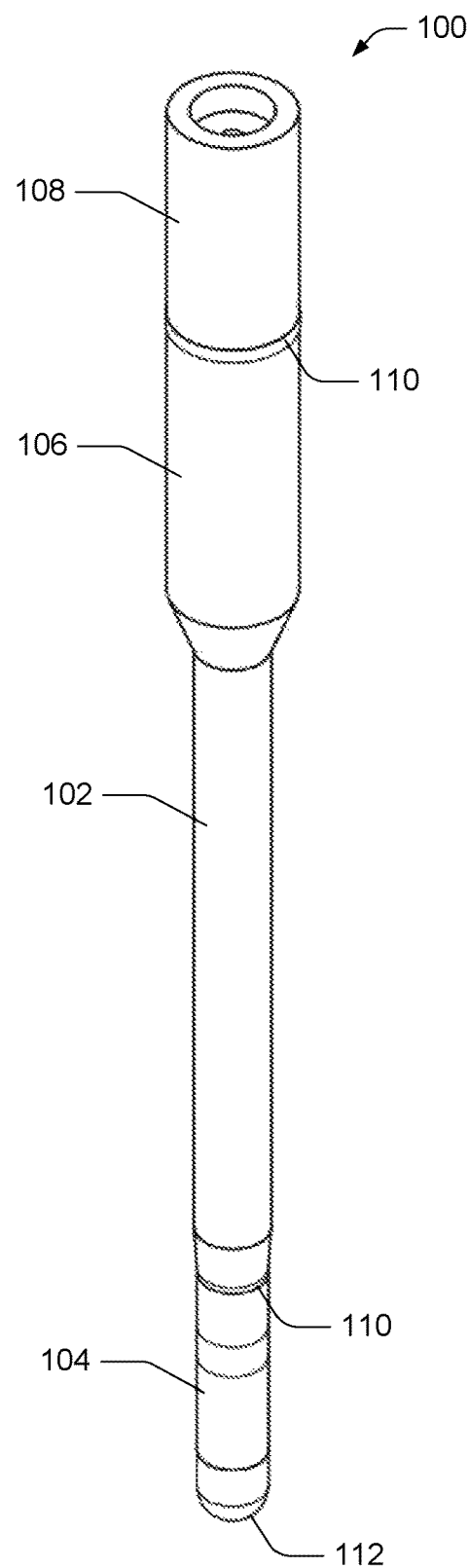
FIG. 1 shows a perspective view of an example tactical pen, in a closed configuration, according to an embodiment.

Representative implementations of devices and techniques provide a tactical pen that may include various useful features and components, according to various embodiments. In the implementations, the tactical pen is comprised of multiple components (e.g., two or more sections) which may be coupled together and which may be sealed with one or more seals to provide moisture or humidity protection to the contents of the pen. For example, in addition to an ink pen refill (e.g., ball-point pen refill), the tactical pen may include one or more cavities or compartments to store items, as well as one or more additional tools or implements.

The tactical pen allows for a user to carry a writing instrument, which many users desire to either have on their person or to have easily accessible to them throughout the day, with additional desirable features and components. For example, in an implementation, the tactical pen also includes a storage compartment that may conveniently be used to store cash, an electronic memory storage device or dongle, earrings, cosmetics, medication, or other valuables. In another implementation, the tactical pen includes a sharply-pointed tool that may be used to break glass or to defend the user against an attacker. In a further implementation, the tactical pen includes a stylus that may be used with a touch-screen electronic device. In an embodiment, the stylus is arranged to cover the sharply-pointed tool for user protection and easy access to the features of both. In various embodiments, other configurations are also possible.

As shown in the accompanying figures, the tactical pen includes multiple removable sections which may be re-attached in several configurations for convenience (and safety) of the user. In various embodiments, the multiple sections include fluid-tight seals at the joints of the sections, which can provide protection to contents of the tactical pen's interior compartments against the environment.

Techniques and devices are discussed herein with reference to example writing instruments illustrated in the figures. However, this is not intended to be limiting, and is for ease of discussion and illustrative convenience. The techniques and devices discussed may be applied to any of various other designs, combinations, and the like, which include tools, weapons, or other implements or accessories, and remain within the scope of the disclosure. Further, the shape of the tactical pen illustrated in the figures may vary based on the various implements included, as well as to accommodate various applications.

Implementations are explained in more detail below using a plurality of examples. Although various implementations and examples are discussed here and below, further implementations and examples may be possible by combining the features and elements of individual implementations and examples.

Example Embodiments

FIGS. 1-6 show various views of an example tactical pen 100. The views are not intended to be limiting, however. In various embodiments, the tactical pen 100 may include fewer or additional features to those illustrated. The tactical pen 100 may have a different look, including various colors, finishes, textures, shapes, and the like.

In an implementation, as shown in FIGS. 1-6, a tactical pen 100 includes a plurality of sections (at least four sections): a barrel 102, a pen cover 104, a container 106, and a cap 108. In various implementations, the tactical pen 100 may include more sections or portions and remain within the scope of the disclosure. Further, alternate or additional sections or portions may supplement or be substituted for one or more of the sections 102-108, while performing an equivalent function (e.g., forming a sealable tactical pen 100 with a sealable storage container). In various embodiments, the shape and design of the sections 102-108 may vary. For example, the sections 102-108 may be formed so that the tactical pen 100 fits into a case or holder. In other examples, the sections 102-108 may be formed to appeal to a particular or a general aesthetic.

In various implementations, one or more (or all) of the sections 102-108 are partially or fully hollow. This allows items to be placed within the hollow portion of the sections 102-108. The barrel 102 is hollow to accept a writing instrument 602 (see FIG. 6), such as a pen refill, for example, and has an opening 304 at one end for the pen tip of the writing instrument 602 to protrude from (at the pen cover 104 end of the barrel). In various embodiments, the barrel 102 is configured to accept any of various standard ink pen refills, or the like. For example, the pen refill may include a "space pen" refill, which can be used while the pen is inverted, etc.

In various implementations, various writing instruments 602 (such as a pen refill, pencil, etching tool, for instance) may be placed within the hollow portion of the barrel 102. The narrow end of the barrel 102 can be inserted into the hollow portion of the pen cover 104. Further, user items may be placed within the hollow portions of the container 106 and the cap 108.

The pen cover 104 couples to the end of the barrel 102 (by a screw connection, friction fit, bayonet connection, or the like) to cover the tip of the writing instrument 602 and to seal the barrel 102. For example, the pen-cover 104 end of the barrel 102 (and/or the pen cover 104) may include a moisture resistant seal. As shown in FIGS. 1-6, the container 106 may be located at another end of the barrel 102. The container 106 may include a cavity 502 for storing various items, as desired. The cap 108 couples to the end of the container 106 (by a screw connection, friction fit, bayonet connection, or the like) to cover the cavity 306 of the container 106 and to seal the container 106. For example, the cap 108 (and/or the container 106) may include a moisture resistant seal.

Figure 2:
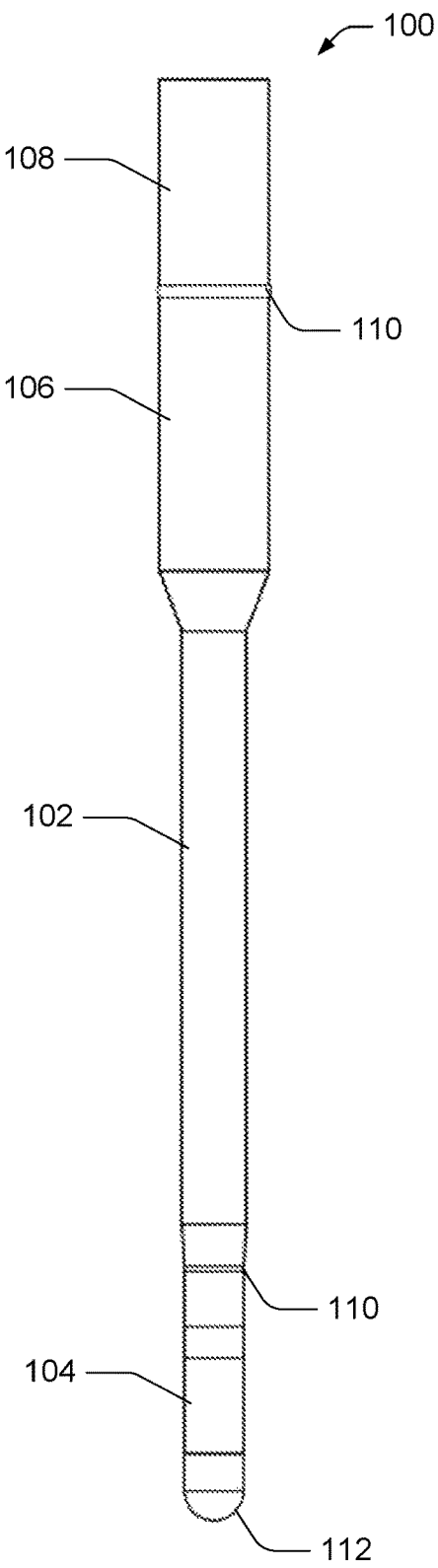
FIG. 2 shows a plan view of the example tactical pen of FIG. 1, in the closed configuration, according to an embodiment.
Figure 5:
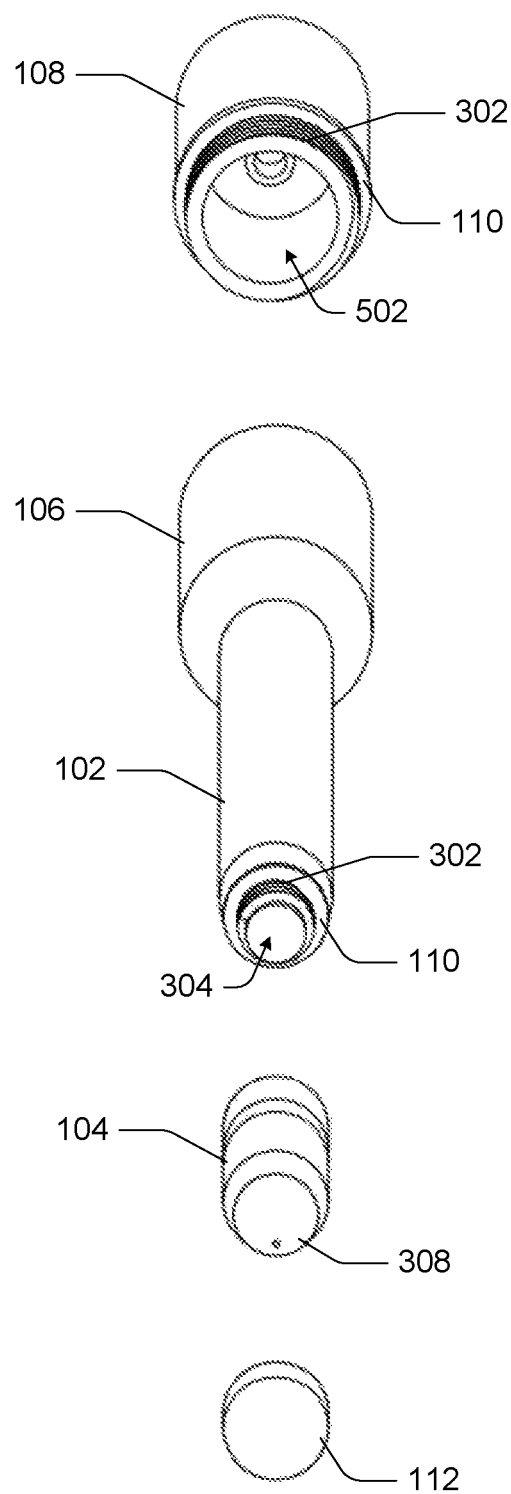
FIG. 5 shows example components of an example tactical pen, according to an embodiment.
Figure 6:
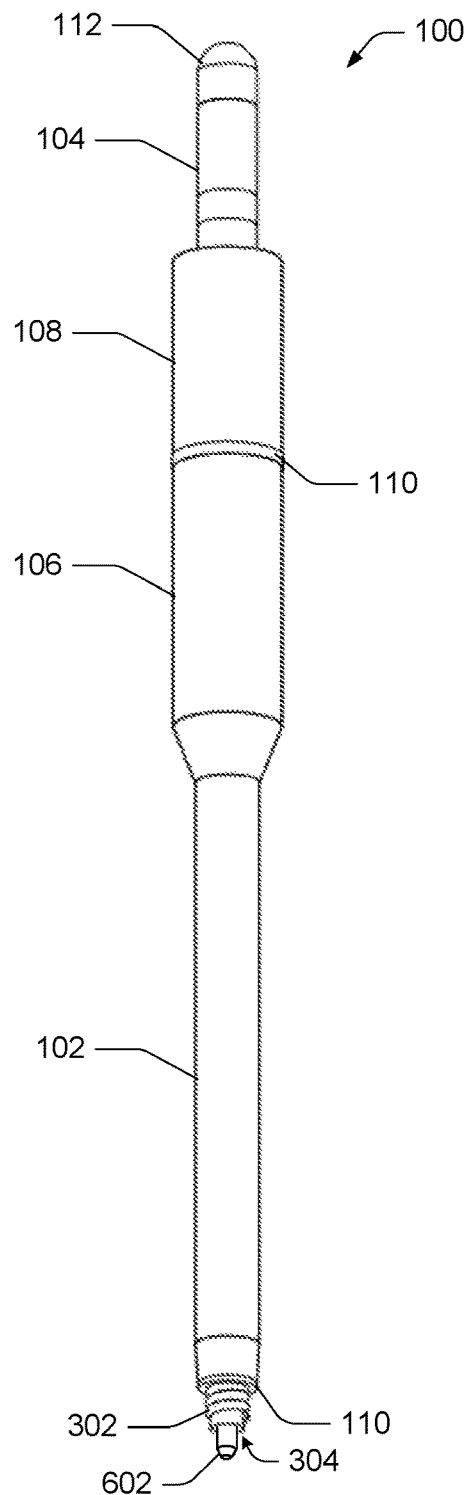
FIG. 6 shows a perspective view of an example tactical pen, in an open configuration, according to an embodiment.

As shown in FIGS. 1-2 and 6, in various configurations, the sections 102-108 may be coupled together into a unified form. For example, as detailed in FIGS. 3-6, each section 102-108 may include one or more features 302 for coupling to one or more of the other sections 102-108. For example, each section 102-108 may include one or more features 302 such as a threaded section, or the like (e.g., bayonet fitting, friction fitting, twist-lock, snap-fitting, etc.) at one or more portions (e.g., ends, etc.) of the section 102-108. In an embodiment, the tactical pen 100 can have more than one unified form or configuration based on the sections 102-108 fitting together in more than one way, and based on coupling the sections 102-108 together in more than one arrangement via the features 302.

FIGS. 1 and 2 illustrate a first (e.g., closed) configuration, where the pen cover 104 is coupled in place on the narrow end of the barrel 102 including the pen opening 304, with the writing instrument 602 of the tactical pen 100 covered and the storage compartment (comprising the container 106 and the cap 108) being sealed. In this configuration, the tactical pen 100 can be carried in a pocket or purse of the user, for instance.

In an implementation, the tactical pen 100 includes a seal 110 at one or more locations between two of the sections 102-108. In various embodiments, the one or more seals 110 comprise fluid-tight O-rings (or like types of seals) at the joints of the sections 102-108, which can provide protection to contents of the interior compartments of the tactical pen 100 against the environment. For instance, the seals 110 can prevent fluids, humidity, or the like from entering the sealed portions of the tactical pen 100, thus protecting the contents of the sealed portions of the tactical pen 100 from exposure. In one example, the seals 110 form a liquid-tight seal between the sections 102-108, preventing liquid from entering the sealed sections 102-108 when the tactical pen 100 is immersed in liquid.

Figure 3:
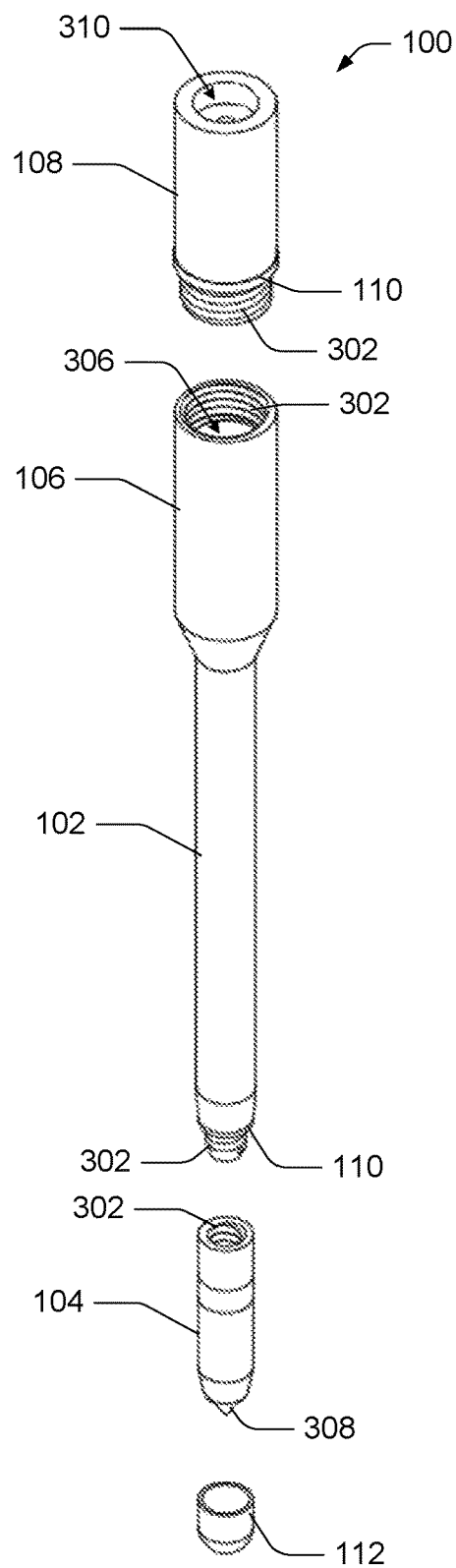
FIG. 3 shows an expanded perspective view of the example tactical pen of FIG. 1, in an open configuration, according to an embodiment.
Figure 4:
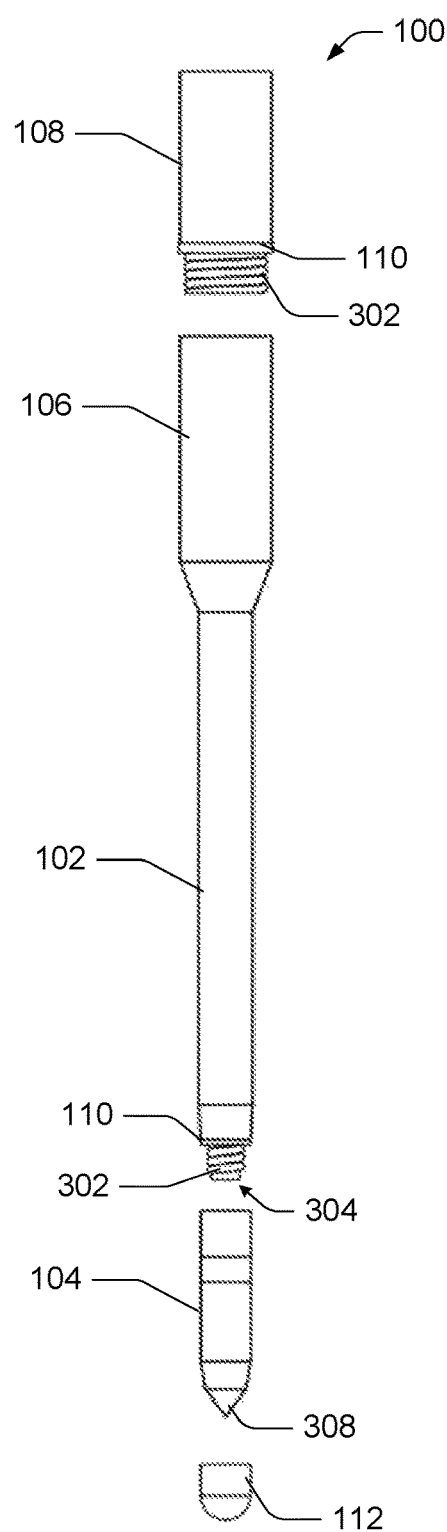
FIG. 4 shows an expanded plan view of the example tactical pen of FIG. 1, in an open configuration, according to an embodiment.

FIGS. 3 and 4 illustrate a second (e.g., open) configuration, where the pen cover 104 is removed from the narrow end of the barrel 102 (e.g., the pen opening 304 of the tactical pen 100 is exposed) and the cap 108 is removed from the container 106 (e.g., the storage compartment is open). In this configuration, where the pen cover 104 is removed from the pen opening 304, a writing instrument 602 such as a pen refill, a pencil, or the like, may present for use from the pen opening 304 at the narrow end of the barrel 102. In various embodiments, the writing instrument 602 is presented when the pen cover 104 is removed from the barrel 102, without further action from the user. In some cases, the writing instrument 602 may be spring-loaded, or the like. In alternate embodiments, the user may activate the writing instrument 602 (e.g., rotate the barrel, press a button, slide a slide, etc.) after removing the pen cover 104 to present the writing instrument 602 for use.

The container 106 may be integral to the barrel 102 or may be coupled to the barrel 102. User items (such as a flash drive, currency, jewelry, etc.) may be placed within the cavity 306 (e.g., the hollow portion of the container 106) when the cap 108 is removed. In an implementation, as shown in FIG. 5, the cap 108 also includes a cavity 502 (e.g., a hollow portion) for additional storage, or to expand the storage of the container 106.

Other open configurations of the tactical pen 100 include a configuration where the cap 108 is removed from the container 106 and the pen cover 104 is coupled to the barrel 102, and a configuration where the pen cover 104 is removed from the barrel 102 and the cap 108 is coupled to the container 106. In the latter configuration, the pen cover 104 may be coupled to the cap 108, as shown in FIG. 6.

In an implementation the tactical pen 100 may include a sharp pointed tool 308, such as a window breaking tool, self-defense tool, or the like, at an end of the tactical pen 100. The sharp pointed tool 308 can be a sharply pointed implement that can be struck against a glass window (or the like) to shatter the window. This can allow the user to escape from a disabled automobile, for instance, if the user is trapped within it, or allow the user to rescue someone else that may be trapped within a disabled automobile. Alternately, the sharp pointed tool 308 can be used in self-defense to protect the user from an attacker. In an embodiment, the sharp pointed tool 308 is designed to penetrate through most clothing, including leather (e.g., shoes, boots, a jacket, etc.), heavy denim, and so forth. For instance, the sharp pointed tool 308 may be constructed of steel, aluminum, titanium, a composite, or the like, and may be sharpened to a very sharp point.

In an embodiment, as shown in FIGS. 3-5, the sharp pointed tool 308 is disposed at (e.g., coupled to or integral to) an end of the pen cover 104. In this arrangement, the pen 100 can be held by the barrel 102, with the user's thumb on the large end of the cap 108, for instance, when striking an object with the sharp pointed tool 308. For example, the top of the cap 108 may be substantially flat, so that a user's thumb can be placed at the top of the cap 108 comfortably when using the sharp pointed tool 308 (while the pen cover 104 is coupled to the barrel 102 and covering the tip of the writing instrument 602).

In an implementation, the tactical pen 100 includes a stylus 112, such as a natural or artificial rubber stylus, for example, removably coupled to the sharp pointed tool 308 or to the pen cover 104. The stylus 112 is arranged to cover the sharp pointed tool 308 and arranged to provide input when used with a touch-screen device. For example, the pen cover 104 may include the soft rubber (or the like) stylus 112 for use with a capacitive touch screen device (such as a smart phone, tablet, or the like).

In some embodiments, the stylus 112 may fit over, and cover the sharp pointed tool 308 at the end of the pen cover 104. In this arrangement, the soft stylus 112 protects the user from the sharp pointed tool 308. However, the sharp pointed tool 308 may be used without removing the stylus 112, if desired. The sharp pointed tool 308 may be struck against an object (or used as a self-defense weapon) without removing the stylus 112, and will pierce the stylus 112 when used in this manner. In some embodiments, the stylus 112 may include a small hole in the end of the stylus 112 tip as a location for the sharp pointed tool 308 to emerge. In various embodiments, the sharp pointed tool 308 may comprise other tools or implements (such as a screw driver, an awl, a knife blade, a file, etc.) disposed at the end of the pen cover 104. In the embodiments, a stylus 112 may fit over and cover the tools or implements.

In an implementation, as shown in FIG. 6, the pen cover 104 may be coupled to the cap 108 (via screw fitting, friction fit, bayonet fitting, etc.) while the writing instrument 602 is in use. If the pen cover 104 includes a stylus 112, the writing instrument 602 and the stylus 112 may be used alternately while in this configuration. Otherwise, the stylus 112 may be used when the pen cover 104 is coupled to the barrel 102 end, covering the tip of the writing instrument 602. In various embodiments, the top of the cap 108 includes a recess 310 (as shown in FIG. 3) that is sized to accept the pen cover 104. The pen cover 104 can be placed there or coupled there (e.g., with a screw fitting, bayonet fitting, friction fitting, twist-lock, etc.) while using the pen 100 as a writing instrument, for example.

In an alternate embodiment, the recess 310 and/or the cavity 52 in the cap 108 can include an attachment location for a fastener (or the like) so that an accessory can be coupled to the inside or the outside of the cap 108. For example, the attachment location can include screw threads or other attachment features for convenience. In various examples, the accessory may include an implement, a tool, a lanyard, and so forth.

In various implementations, the tactical pen 100 may be comprised of one or more durable materials (metals, composites, polymers, etc.) that allow the pen 100 to be rigid and unbreakable, and able to withstand great shock forces when used as a tool. (The materials may also be relatively lightweight to allow the tactical pen to be easily used as a writing instrument.) In an embodiment, the tactical pen 100 (e.g., the sections 102-108) are comprised of aircraft aluminum, an aluminum alloy, or the like.

Additional features and benefits of the tactical pen 100 will be apparent to persons having skill in the art. In some embodiments, the tactical pen 100 includes additional or alternate components. Further, some examples of components of a tactical pen 100 may have a different shape, size, finish, or design than as illustrated in FIGS. 1-6.

In the various example embodiments illustrated in FIGS. 1-6, the location and position of attachment devices, coupling mechanisms, and the like are for example only. Other locations and positions are contemplated and are within the scope of this disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the disclosed techniques, systems, and devices. Further, individual features of various embodiments may be combined to form other embodiments not specifically described.

What is claimed is:

1. An apparatus, comprising:
   a hollow barrel having a writing instrument within the barrel, the barrel including an opening at a first end of the barrel, a tip of the instrument arranged to protrude from the opening;
   a container integral to a second end of the barrel, the container including a storage cavity configured for storage of a user's personal items;
   a cap removably coupled to an opening of the container;
   a pen cover removably coupled to the first end of the barrel and configured to cover the tip of the instrument when the tip is not in use a natural or artificial rubber stylus removably coupled to the pen cover; and
   a sharp implement coupled to or integral to an end of the pen cover.

2. The apparatus of claim 1, where the natural or artificial rubber stylus is arranged to provide input when used with a touch-screen device.

3. The apparatus of claim 1, wherein the stylus is arranged to cover the sharp implement.

4. The apparatus claim 1, wherein the sharp implement is configured to emerge through the stylus when the sharp implement is struck against an object while the stylus is covering the sharp implement.

5. The apparatus of claim 1, further comprising one or more seals disposed at the cap, the barrel, and/or the pen cover to seal the container and/or the barrel from humidity or moisture.

6. The apparatus of claim 1, wherein the writing instrument comprises an ink pen refill.

7. The apparatus of claim 1, wherein the writing instrument comprises a pencil.

8. The apparatus of claim 1, wherein the cap includes another cavity that expands a storage capacity of the container when the cap is coupled to the container.

9. The apparatus of claim 1, wherein the cap includes one or more features configured to removably couple the pen cover to the cap.

10. The apparatus of claim 1, wherein the cap includes one or more features configured to couple an accessory to the inside or the outside of the cap.

11. A tactical pen, comprising:
- a hollow barrel configured to accept an ink pen refill within the barrel, the barrel including an opening at a first end of the barrel configured for a tip of the refill to protrude from;
- a container coupled to or integral to a second end of the barrel, the container including a cavity configured for storage of a user's personal items;
- a cap arranged to be removably coupled to an opening of the container to seal the container;
- a pen cover arranged to be removably coupled to the first end of the barrel to cover the tip of the refill when the tip is not in use; and
- a sharply-pointed window break tool coupled to or integral to an end of the pen cover, and configured to be struck against a glass pane to shatter the glass pane; and
- a natural or artificial rubber stylus removably coupled to the window break tool or the pen cover.

12. The tactical pen of claim 11, wherein the natural or artificial rubber stylus is arranged to cover the window break tool and arranged to provide input when used with a touch-screen device.

13. The tactical pen of claim 11, wherein the window break tool is configured to emerge through the stylus when the window break tool is struck against an object while the stylus is covering the window break tool.

14. The tactical pen of claim 11, further comprising a coupling feature disposed at an end of the barrel, the container, the cap, and/or the pen cover.

15. The tactical pen of claim 14, wherein the coupling feature comprises a screw-type feature, a bayonet feature, a friction fit feature, or a twist-lock feature.

16. The tactical pen of claim 11, further comprising one or more seals disposed at the cap, the barrel, and/or the pen cover to seal the container and/or the barrel from humidity or moisture.

17. The tactical pen of claim 11, wherein the cap includes another cavity configured to expand a storage capacity of the container when the cap is coupled to the container.

18. The tactical pen of claim 11, wherein one or more of the barrel, the container, the cap, and the pen cover are comprised of aircraft aluminum.

19. A tactical pen, comprising:
- a hollow barrel configured to accept an ink pen refill within the barrel, the barrel including an opening at a first end of the barrel configured for a tip of the refill to protrude from;
- a container coupled to or integral to a second end of the barrel, the container including a cavity configured for storage of a user's personal items;
- a cap arranged to be removably coupled to an opening of the container and configured to seal the container, the cap including another cavity configured to expand a storage capacity of the container when the cap is coupled to the container;
- a pen cover arranged to be removably coupled to the first end of the barrel and configured to cover the tip of the refill when the tip is not in use;
- a sharply-pointed window break tool coupled to or integral to an end of the pen cover, and configured to be struck against a glass pane to shatter the glass pane; and
- a natural or artificial rubber stylus removably coupled to the window break tool or the pen cover, and arranged to cover the window break tool, and arranged to provide input when used with a touch-screen device.

20. The tactical pen of claim 19, wherein the cap includes a substantially flat surface opposite an opening of the cap, configured for a user's thumb when using the window break tool.

* * * * *